Nov. 14, 1950          R. L. WEIR          2,530,276
ROTOR FOR HELICOPTERS
Filed Feb. 6, 1946          2 Sheets-Sheet 1
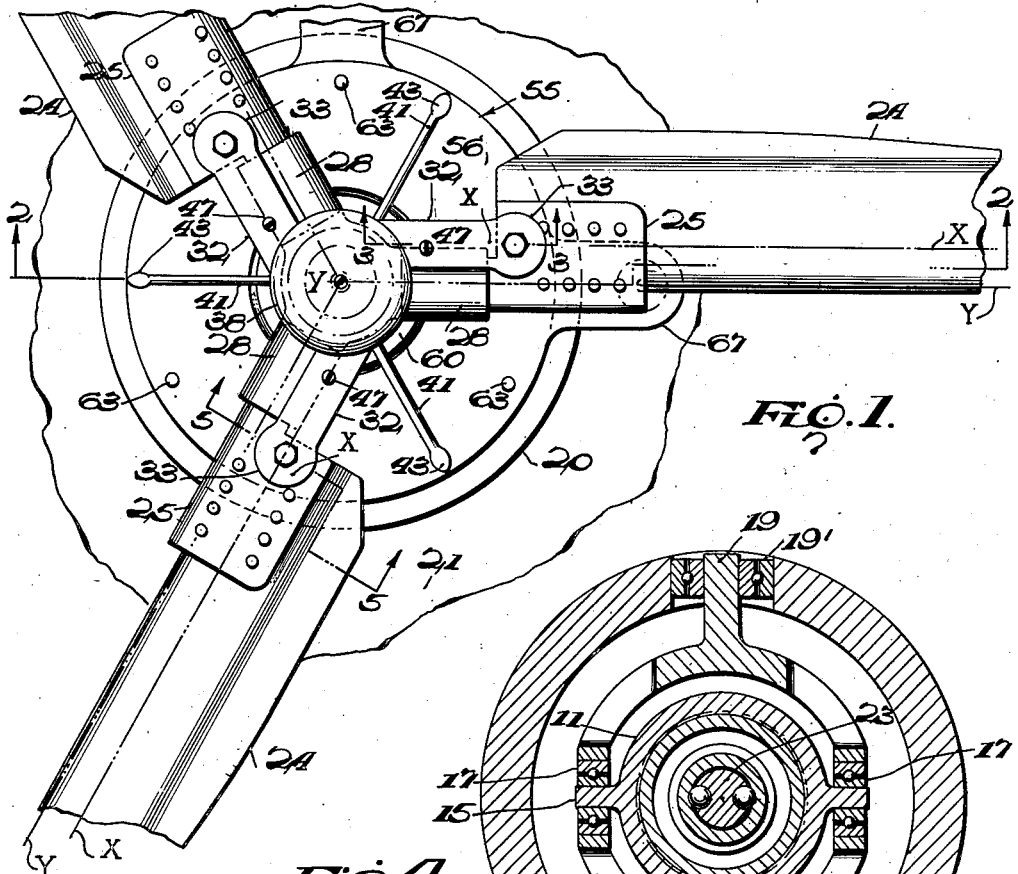
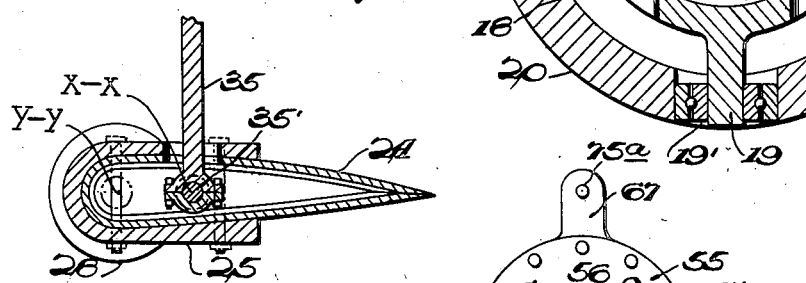
Inventor
Richard L. Weir
By
Attorney

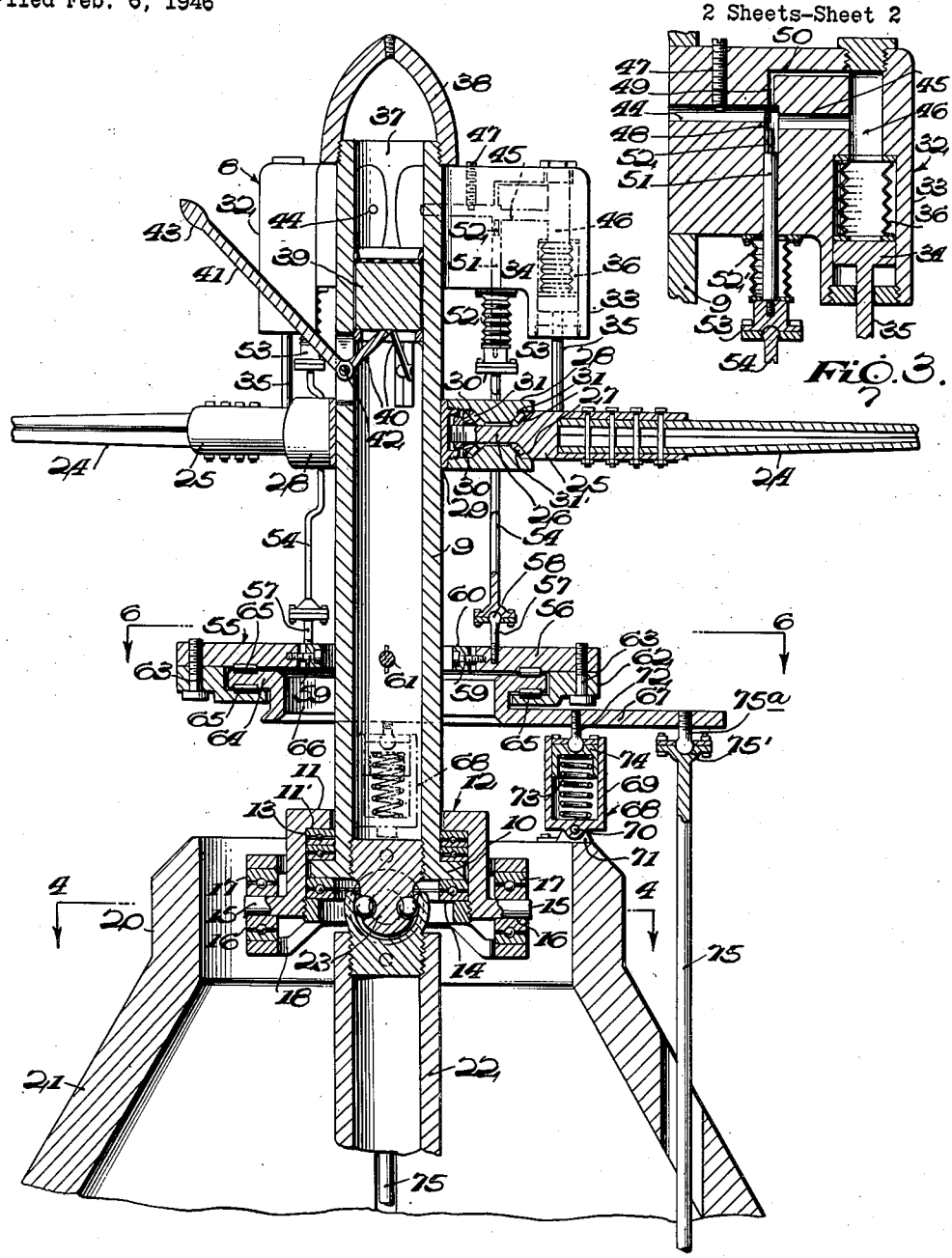

Patented Nov. 14, 1950

2,530,276

UNITED STATES PATENT OFFICE 2,530,276

ROTOR FOR HELICOPTERS

Richard L. Weir, Warren, Ohio, assignor of thirty per cent to Vincent Mulvaney, Cheyenne, Wyo.

Application February 6, 1946, Serial No. 645,720

11 Claims. (Cl. 170—160.21)

My invention relates to a rotor for helicopters.

An important object of the invention is to provide means for increasing the pitch of the rotor blades in direct proportion to an increase in the speed of the engine.

A further object of the invention is to provide hydraulic means for connecting the several variable pitch blades of the rotor so that the lift on the several blades is equalized.

A further object of the invention is to provide centrifugally operated hydraulic means for connecting the blades of the rotor, and to vary their pitch.

An important object of the invention is to provide means including a centrifugal governor for providing a constantly equalized lift on each blade of the helicopter rotor in all attitudes of the rotor.

A further object of the invention is to provide means which are manually operated to change the attitude of the rotor.

A further object is to provide manually operated means, operating in conjunction with the hydraulic connection between the rotor blades, to vary the pitch of each blade during its cycle of operation.

A further object is to provide means whereby the attitude of the rotor is automatically changed by changing the pitch of the blades.

A further object is to provide a universal mounting between the rotor and the fuselage of the helicopter, whereby the attitude of the fuselage will remain substantially level and constant while the attitude of the rotor is changed.

Other important objects and advantages of this invention will be apparent during the course of the following description.

In the accompanying drawings forming a part of this application, and in which like numerals are employed to designate like parts throughout the same, Figure 1 is a plan view of the helicopter rotor embodying my invention, parts broken away, Figure 2 is a central vertical longitudinal section through the rotor taken on line 2—2 of Figure 1, Figure 3 is an enlarged central vertical section through one of the hydraulic connection blocks taken on line 3—3 of Figure 1, Figure 4 is a horizontal section taken on line 4—4 of Figure 2, Figure 5 is an enlarged vertical transverse section taken on line 5—5 of Figure 1, Figure 6 is a reduced plan view of the swash plate taken on line 6—6 of Figure 2, and Figure 7 is a schematic side elevation of the manual control linkage, used by the pilot of the helicopter to change the attitude of the rotor.

In the drawings where for the purpose of illustration is shown a preferred embodiment of my invention, the numeral 8 designates the helicopter rotor as a whole. The numeral 9 designates a tubular rotor shaft having a flange 10 at its lower end. The tubular shaft 9 is rotatable on its vertical axis within the swinging head 11 of a rotor universal 12. An end thrust ball bearing 13 is arranged between the top surface of the flange 10 and the inner surface 11' of the head 11. An end thrust ball bearing 14 is mounted within the head 11, beneath the flange 10, as shown. The head 11 has diametrically oppositely arranged pivots or trunnions 15, pivotally mounted within the openings 16 of ball bearings 17, carried by the companion swinging head or member 18, of the rotor universal 12. The head 18 has diametrically oppositely arranged pivots or trunnions 19, journaled in ball bearings 19' carried by the upper ring structure 20, formed upon the top projection 21 of the fuselage of the helicopter.

The tubular shaft 9 is connected at its lower end with a vertical drive shaft 22, through the medium of a universal coupling or joint 23. This universal joint is of the constant velocity type, and its construction is well known. The drive shaft 22 is driven from the engine of the helicopter, and this drive shaft is vertical with respect to the horizontal axis of the fuselage. Suitable fixed bearings and support are provided for the drive shaft 22 in the structure of the fuselage, not shown.

The rotor 8 includes blades 24, having hub structures 25 provided with reduced cylindrical portions 26 and tapered shoulders 27. A corresponding number of tubular couplings 28 are provided, the inner ends of which are suitably attached to a hub ring 29, which is in turn rigidly attached to and carried by tubular shaft 9. Each reduced hub portion 26 carries a wedge block 30, having a tapered face 30'. The coupling 28 has a main bore for receiving the hub portion 26, and recesses for receiving the tapered shoulder 27 and wedge block 30. The recesses have tapered surfaces 31, and bearing rollers 31' are arranged between the parts, as shown. It is thus seen that the blades 24 are mounted upon the tubular shaft 9 so that they may turn upon their longitudinal axes to vary their pitch.

Arranged above the blades 24 are a corresponding number of generally radial hydraulic connection blocks 32, rigidly attached to and carried by the tubular shaft 9 by any suitable means. These blocks have main cylinders 33 formed thereon, which are vertical when the tubular shaft 9 is vertical. Mounted to reciprocate within the cylinders 33 are plungers 34, having connecting rods 35 extending downwardly to connect with the blades 24, to turn the blades upon their longitudinal axes. The connecting rods 35 are adapted at their lower ends to receive suitable hinge pins 35' which are built into the structure of the blades 24, and rigidly secured thereto. It should be noted that the longitudinal axes of the hinge pins coincide in plan with the aerodynamic axes of lift $x$—$x$ of the rotor blades, and that the longitudinal pivoting axes $y$—$y$ of the blades are ahead of the axes of lift and near the leading edges of the rotor blades. The plungers 34 are equipped with bellows 36 to prevent leakage of the hydraulic fluid from the cylinders.

The upper end portion of the tubular shaft 9 is in the form of a cylinder 37, the top of which is open and covered by a head or cap 38, as shown. Mounted to reciprocate within the cylinder 37 is a main plunger 39. This main plunger is moved upwardly in the cylinder 37 by bell crank ends 40, forming part of generally radial levers 41, pivoted at 42, to the tubular shaft 9, to swing generally longitudinally of the tubular shaft. The levers 41 are provided at their outer ends with governor weights 43. When the drive shaft 22 is revolving, and the levers 41 are acted upon by centrifugal force, the weights 43 move radially outwardly and the bell crank ends 40 shift the plunger 39 upwardly within the cylinder 37. Above the plunger 39, cylinder 37 has communication with ports 44, and these ports 44 lead into ports 45, leading into passages 46, leading to the bellows 36. If desired, an adjustable orifice plug 47 can be provided in connection with each port 44, to regulate the passage of hydraulic fluid therethrough. In view of the foregoing disclosure, it will be seen that the cylinder 37 and associated elements form hydraulicly connected means between the several blades 24, so that the lift on the individual blades is maintained equalized. In addition, when the plunger 39 moves in cylinder 37, the pitch of the several blades 24 are simultaneously changed.

Each block 32 is further provided with a cylindrical bore 48, which leads into the adjacent ends of the ports 44 and 45. The block has a reduced cylindrical bore 49, in axial alignment with the bore 48. Bore 49 communicates with a port 50, communicating with the passage 46. Mounted to reciprocate within the bore 48 is a cylindrical plunger 51, having a reduced cylindrical plunger extension 52, to enter the reduced port 49. The plunger 51 extends outwardly beyond the bore 48 and is equipped with a bellows 52', to prevent leakage. At its lower end, a coupling 53 is attached to the plunger 51 which has a ball and socket connection with a push rod 54. When the plunger 51 moves upwardly sufficiently, it closes or covers the inner end of the port 45, preventing the escape of fluid from the inner end of this port, while the plunger extension 52 enters the reduced bore 49, and forces the volume of fluid within the bore 49 through the port 50 and into the passage 46 in cylinder 33. The plunger 34 is then moved downwardly to increase the pitch of the blade 24, to which it is attached by connecting rod 35. It should be mentioned here that it may be desirable to omit entirely the reduced cylindrical extension 52, the reduced bore 49 and the port 50. In this case the cylindrical plunger 51 will function to close or cover the inner end of the port 45, preventing the escape of fluid from the same, and no additional volume of fluid will be forced into the passage 46.

A swash plate 55 is provided to actuate the push rods 54. This swash plate includes an upper outer ring 56, to which rods 57 are rigidly attached, and these rods have a universal connection with the push rods 54, as shown at 58. The upper outer ring 56 has pivot pins 59, diametrically oppositely arranged and rigidly secured thereto. The pins 59 are pivotally mounted upon an upper inner ring 60. The upper inner ring 60 is pivotally mounted upon a pin 61, carried by and extending through the tubular shaft 9, and disposed at 90° from the pins 59. It is therefore, obvious that the ring 56 is universally mounted upon the tubular shaft 9. The ring 56 must rotate with the shaft 9 and be tiltable in all directions. Arranged beneath the ring 56 is a coupling ring 62, secured thereto by bolts 63 or the like. A tilting ring 64 is disposed between the ring 62 and the ring 56, and roller bearings 65 are provided, as shown. The ring 64 has an annular flange portion 66, having radial arms 67, rigidly secured thereto. The ring 64 must be universally tiltable but must be held against rotation. To accomplish this, leveling units 68 are employed, each comprising an outer cylinder 69, adapted at its lower end to pivot on pin 70, as shown, and to swing vertically in one plane only. Since the pivot pin 70 is secured in its mounting bracket 71 to the upper ring structure 20 of the fuselage, the unit 68 obviously cannot rotate with the rotor. Pins 72 are rigidly secured to the radial arms 67 and have universal connections with plungers 74, moved upwardly by springs 73. It is thus seen that the units 68 and associated elements will hold the tilting ring 64 against rotation, but permit of its universal tilting adjustment, and will automatically return it to the level position when it is released. The plate 64 is tilted by means of upstanding rods 75, having universal connections at 75' with ball rods 75A, rigidly attached to the radial arms 67. The rods 75 are arranged 90° apart. The rods 75 are suitably attached at their lower ends within the helicopter, to bell cranks or the like 76, as shown schematically in Figure 7. Levers 77 are pivoted to links 78, pivoted to the bell cranks 76. When the pilot operates the levers 77, the rods 75 will move longitudinally, and the entire swash plate 55 may be angularly adjusted to any plane within its limit of travel since it is universally mounted as previously described. The ring 56 will tilt to accommodate itself to the inclination of ring 64, as the ring 56 rotates.

The operation of the helicopter rotor is as follows:

When the helicopter is rising vertically, the tubular shaft 9 is vertical. Any change in the speed of rotation of the tubular shaft 9 will be converted through the centrifugal means to a movement of the main plunger 39, and its associated hydraulicly actuated elements will effect a corresponding change in the pitch of the rotor blades 24. Since the rotor blades are now turning in a horizontal plane, the plungers 51 will be in a retracted or lowered position, and will not reciprocate with relation to the blocks 32, and hence all of the blades are connected with each other through the hydraulic means, and the lift on the several blades is maintained equalized.

When it is desired to change the attitude of the rotor, to assume directional flight, the rods 75 are manually shifted generally longitudinally to tilt the swash plate 55. This tilting may occur in any plane, as the rings 56 and 60 with their pivot pins 59 and 61 provide a universal mounting for the swash plate. Assuming that the right hand side of the swash plate 55, Figure 2, has been manually elevated, and its left hand side lowered; then as each push rod 54 approaches the high point of the tilted swash plate, this rod 54 will be elevated. Each corresponding plunger 51 will be elevated, and will first cover the inner end of the port 45, thereby preventing the escape of fluid from the port. The reduced plunger extension 52 will then enter the reduced bore 49 and force the volume of fluid in this bore through the port 50, passage 46, and into the cylinder 33, to move the plunger 34 and its connecting rod 35 downwardly. This downward movement of connecting rod 35 will cause the rotor blade to swing on its longitudinal axis of rotation y—y to increase its pitch. During this action the other blades of the rotor of course remain hydraulically connected, and their lift is maintained equalized. As each blade 24 approaches the lowered position of the tilted swash plate 55, the corresponding plunger 51 has moved downwardly to uncover the inner end of the port 45, and this plunger 51 has now moved down for a greater distance in its bore 48 than it does when the swash plate assembly is level. Therefore, there is now an increased space within the bore 48 with each rotor blade at the left or lowered position of the swash plate. This increased space will permit the plunger 34 to move upwardly and reduce the pitch of the blade at the left or lowered side. It is thus seen that the pitch of each blade will be increased in succession, during each cycle of rotation of the rotor, as it approaches the high side of the tilted swash plate. This increase in pitch will cause an increase in the lift on that blade, and the attitude of the rotor will be changed to accomplish directional flight. In other words, the blade or blades having the increased pitch possesses a greater lifting force, and the tubular shaft 9 will swing or lean away from the blade or blades having this increased pitch. In connection with Figure 2 of the drawings, the tubular shaft 9 would have its upper end swung to the left. The helicopter will always travel in the direction of the low side of the plane of rotation of the several rotor blades. When the plunger extension 52 and bore 49 are omitted, no additional fluid will be forced into the cylinder 33 at the high point of the tilted swash plate, but the plunger 34 will then lock the corresponding blade at its present pitch. When the other blade reaches the low side of the swash plate, its pitch will be decreased, because the plunger 51 moves further down in the bore 48, and some of the fluid from the cylinder 33 of this blade can pass from such cylinder.

It is to be understood that the form of my invention herewith shown and described is to be taken as a preferred example of the same and that various changes in the shape, size and arrangement of parts may be resorted to without departing from the spirit of the invention or the scope of the subjoined claims.

Having thus described the invention, I claim:

1. A rotor for helicopters comprising a plurality of variable pitch blades, pressure operated devices connected with the blades, mechanically operated fluid pressure supplying mechanism having means of communication with each fluid pressure operated device, means forming a chamber leading into each means of communication, an element movable within each chamber and when shifted in one direction to cover the means of communication and when shifted in an opposite direction to move inwardly beyond the intake end of said chamber, and means to move each element.

2. A rotor for helicopters comprising a plurality of variable pitch blades, hydraulic devices connected with the blades, mechanically operated hydraulic mechanism, means forming a passage between the hydraulic mechanism and each hydraulic device, said means also forming a first chamber and a second chamber which are arranged in opposed relation, said first chamber leading into the passage, said second chamber having one end leading into the passage and having its opposite end leading into the hydraulic device, a plunger operating within the first chamber and movable across the passage to cover the passage and having a part to enter the second chamber and force additional fluid into the hydraulic device, and means to move the plunger.

3. A rotor for helicopters, comprising variable pitch blades, hydraulic devices connected with the blades to vary their pitch, a block carrying each hydraulic device and having a main port leading to the hydraulic device, said block having a first chamber leading to the main port and a second chamber arranged opposite the first chamber, said second chamber having one end leading into the main port and its opposite end portion leading into the hydraulic device, a plunger mounted to reciprocate in the first chamber and movable across the main port to cover it and having a part movable into the second chamber, means to move the plunger, and means to supply fluid under pressure to the main port.

4. A helicopter rotor, comprising a support to be mounted upon the helicopter fuselage, a hollow head having a universal mounting upon the support and provided with a flange, an upstanding shaft rotatable in the hollow head and provided with a flange disposed beneath the first named flange and provided with a cylinder in its upper portion, a drive shaft beneath the upstanding shaft, a universal joint connecting the drive shaft and upstanding shaft, a plunger mounted within the cylinder, a centrifugally operated device mounted upon the upstanding shaft to rotate therewith and engaging the plunger to move it upwardly, a plurality of variable pitch blades mounted upon the upstanding shaft to rotate therewith and turn upon their longitudinal axes with relation thereto, a plurality of connecting members corresponding in number and arrangement to the blades and arranged above the blades and mounted upon the upstanding shaft to rotate therewith, each connecting member having an upstanding cylinder and a port connecting such cylinder with the cylinder of the upstanding shaft and a bore leading to the port, a main plunger in the cylinder of the member, a depending rod connected with the last named plunger and the adjacent blade rearwardly of the turning axis of the blade to increase the pitch of the blade when the member plunger moves downwardly, a valve plunger mounted in the bore of each connecting member to cover the port of such connecting member when the valve plunger is moved upwardly, depending rods connected with the valve plunger, a swash plate surrounding the upstanding shaft and disposed beneath the rods and secured to the rods, a universal mounting securing the swash plate to the upstanding shaft so that the swash plate rotates with the upstanding shaft, and means connected with the swash plate to tilt it.

5. A helicopter rotor, comprising a support to be mounted upon the helicopter fuselage, a bearing member, an upstanding shaft rotatable within the bearing member and provided with a cylinder, a universal mounting connecting the bearing member and support, a drive shaft, a universal joint connecting the drive shaft and upstanding shaft, a plunger within the cylinder, a centrifugally operated device mounted upon the upstanding shaft to rotate therewith and serving to move the plunger, a plurality of variable pitch blades mounted upon the upstanding shaft to rotate therewith, cylinders mounted upon the upstanding shaft to rotate therewith, each cylinder having a port connecting such cylinder with the cylinder of the upstanding shaft and a bore leading to the port, main plungers within the last named cylinders and connected with the blades to vary their pitch, valve plungers within the bores to cover and uncover the ports, a swash plate having a universal mounting upon the upstanding shaft, means connecting the swash plate and valve plungers, and means to tilt the swash plate.

6. A helicopter rotor, comprising a support to be mounted upon the helicopter fuselage, an upstanding shaft provided with a cylinder carried thereby, means engaging the upstanding shaft to universally mount the same upon the support, means to drive the upstanding shaft, a plunger within the cylinder, centrifugally operated arms pivotally mounted upon the upstanding shaft and having parts acting against the plunger to move it, cylinders mounted upon the upstanding shaft, each cylinder having a separate means of communication with the cylinder of the upstanding shaft, a plurality of variable pitch blades mounted upon the upstanding shaft to rotate therewith, main plungers within the last named cylinders and connected with the blades to vary their pitch, and means for changing the pitch of the individual blades cyclically including members to close the means of communication leading to the corresponding cylinders.

7. A helicopter rotor, comprising a support to be mounted upon the helicopter fuselage, an upstanding shaft provided with a cylinder carried thereby, means engaging the upstanding shaft to universally mount the same upon the support, means to drive the upstanding shaft, a plunger within the cylinder, centrifugally operated arm means pivotally mounted upon the upstanding shaft and acting against the plunger to move it, pressure operated devices mounted upon the upstanding shaft for rotation therewith and having ports leading into the cylinder of the upstanding shaft and bores leading to the ports, a plurality of variable pitch blades mounted upon the upstanding shaft to rotate therewith and connected with the pressure operated devices to have their pitch varied by such devices, valve plungers mounted within the bores and adapted to close the ports, and means to move the valve plungers.

8. A helicopter rotor, comprising a support to be mounted upon the helicopter fuselage, an upstanding shaft provided with a cylinder carried thereby, a universal mounting connecting the upstanding shaft and support, means to drive the upstanding shaft, a plunger within the cylinder, centrifugally operated means mounted upon the upstanding shaft for rotation therewith and serving to move the plunger, a plurality of variable pitch blades mounted upon the upstanding shaft to rotate therewith, fluid pressure operated devices mounted upon the upstanding shaft to rotate therewith and having connections with the blades to vary their pitch, said devices having ports leading to the cylinder of the upstanding shaft, each device having a main bore leading to the port and an auxiliary bore leading to the port and having communication with the device, a valve plunger operating within the main bore to cover the port, an auxiliary plunger carried by the valve plunger for movement into the auxiliary bore, a swash plate connected with the valve plungers to move them, and means to tilt the swash plate.

9. A helicopter rotor, comprising an upstanding shaft provided with a cylinder carried thereby, means engaging the upstanding shaft to support it, a plunger within the cylinder, centrifugally operated means mounted upon the upstanding shaft for rotation therewith and serving to move the plunger, a plurality of variable pitch blades mounted upon the upstanding shaft to rotate therewith, fluid pressure operated devices mounted upon the upstanding shaft to rotate therewith, each device including a chamber and a movable part connected with one blade, each chamber having a separate passage leading to the cylinder of the upstanding shaft, and means connected with each device to prevent the passage of fluid pressure through the passage.

10. A helicopter rotor, comprising an upstanding shaft provided with a cylinder carried thereby, means engaging the upstanding shaft to support it, a plunger within the cylinder, centrifugally operated means mounted upon the upstanding shaft for rotation therewith and serving to move the plunger, a plurality of variable pitch blades mounted upon the upstanding shaft to rotate therewith, connecting blocks mounted upon the upstanding shaft to rotate therewith and having main cylinders and ports connecting the main cylinders and the cylinder of the upstanding shaft, said connecting blocks having bores leading into the ports, plungers within the main cylinders and connected with the blades to vary their pitch, valve plungers within the bores to cover and uncover the ports, and adjustable means connected with the valve plungers to move them.

11. A helicopter rotor, comprising an upstanding shaft provided with a cylinder carried thereby, means engaging the upstanding shaft to support it, means to drive the upstanding shaft, a plunger within the cylinder, a plurality of variable pitch blades mounted upon the upstanding shaft to rotate therewith, main cylinders mounted upon the upstanding shaft for rotation therewith and having separate passages so that all of the main cylinders may be placed in communication with the cylinder of the upstanding shaft, plungers within the main cylinders and connected with the blades to vary their pitch, means acting against the plunger within the cylinder of the upstanding shaft to move it for supplying fluid pressure to all of the main cylinders, a movable element to cover and uncover each separate passage, a swash plate having a universal mounting upon the upstanding shaft and connected with the elements to move them, and means connected with the swash plate to tilt the same and hold it in the selected tilted position.

RICHARD L. WEIR.

(References on following page)

REFERENCES CITED

The following references are of record in the file of this patent:

UNITED STATES PATENTS

| Number | Name | Date |
|---|---|---|
| 860,447 | Cook | July 16, 1907 |
| 1,350,312 | Hubbard | Aug. 24, 1920 |
| 2,216,163 | Ray | Oct. 1, 1940 |
| 2,216,416 | Mader | Oct. 1, 1940 |
| 2,264,943 | Larsen | Dec. 2, 1941 |
| 2,317,340 | Bennett | Apr. 27, 1943 |
| 2,350,126 | Pitcairn | May 30, 1944 |
| 2,394,846 | Cox | Feb. 12, 1946 |
| 2,408,489 | Stalker | Oct. 1, 1946 |
| 2,435,080 | Hoover | Jan. 27, 1948 |
| 2,439,089 | Hodson | Apr. 6, 1948 |